(12) United States Patent
McKinley

(10) Patent No.: US 8,714,657 B1
(45) Date of Patent: May 6, 2014

(54) METHOD AND DEVICE FOR HOLDING THE TAILGATE OF A DUMP TRUCK PARTIALLY OPEN

(71) Applicant: William A. McKinley, Arvada, CO (US)

(72) Inventor: William A. McKinley, Arvada, CO (US)

( * ) Notice: Subject to any disclaimer, the term of this patent is extended or adjusted under 35 U.S.C. 154(b) by 39 days.

(21) Appl. No.: 13/655,633

(22) Filed: Oct. 19, 2012

(51) Int. Cl.
*B60P 1/26* (2006.01)
(52) U.S. Cl.
USPC ........................................ 298/17 B; 298/23 S
(58) Field of Classification Search
USPC ....... 298/17 B, 17 R, 19 B, 19 R, 23 S, 23 D, 298/23 A, 23 M; 248/351, 354.3, 354.5, 248/354.6; 280/763.1
See application file for complete search history.

(56) References Cited

U.S. PATENT DOCUMENTS

| | | | |
|---|---|---|---|
| 1,768,227 A | 6/1930 | Wine | |
| 1,768,302 A | 6/1930 | Wine | |
| 3,062,587 A | 11/1962 | Miller | |
| 3,572,837 A | 3/1971 | Lackey | |
| 4,685,619 A | 8/1987 | Harder | |
| 6,302,491 B1 | 10/2001 | Anderson | |
| 6,499,808 B2 * | 12/2002 | Palmberg, Jr. | .......... 298/23 MD |
| 6,572,197 B1 | 6/2003 | Clough | |
| 7,591,513 B2 | 9/2009 | Morley | |

* cited by examiner

*Primary Examiner* — Stephen Gordon
(74) *Attorney, Agent, or Firm* — Dorr, Carson & Birney, P.C.

(57) ABSTRACT

A method and device for securing the tailgate of a dump truck in a partially open position employs a removable post having a horizontal hole through its distal end and a vertical opening in its proximal end. The distal end of the post is attached to the tailgate by inserting the latch pin through the hole in the distal end of the post. The proximal end of the post is inserted into the latch of the dump truck, and the dog of the latch is inserted into the opening in the proximal end of the post to secure the proximal end of the post to the latch.

5 Claims, 6 Drawing Sheets

METHOD AND DEVICE FOR HOLDING THE TAILGATE OF A DUMP TRUCK PARTIALLY OPEN

BACKGROUND OF THE INVENTION

1. Field of the Invention

The present invention relates generally to the field of dump trucks. More specifically, the present invention discloses a method and device for holding the tailgate of a dump truck partially open to dispense material from the bed of the dump truck in a controlled manner.

2. Statement of the Problem

Dump trucks have been used for many years to transport and dispense materials (such as sand, road salt, gravel or dirt) from the rear of the bed of the dump truck through a tailgate. FIG. 1 is a rear perspective view of a conventional dump truck 10 with a bed 11 for transporting material. The tailgate 12 is typically pivotally attached by hinges at its upper corners to the rear side walls of the bed 11. The tailgate 12 completely closes the rear opening of the dump truck bed in its closed position, and two latch mechanisms 14 on either side of the rear of the dump truck engage two latch pins 13 that extend laterally outward from the lower edge of the tailgate 12 to secure the tailgate 12 in place. To open the tailgate 12, the operator releases the latch mechanisms 14, thereby allowing the tailgate 12 to freely pivot rearward about its upper hinges. Raising the truck bed 11 causes material in the bed 11 to slide rearward and exert pressure against the tailgate 12. This causes the tailgate 12 to pivot rearward and permits material to exit from the truck bed by flowing through the resulting opening between the bottom of the tailgate and rear end of the bed 11 of the truck 10.

The latch mechanisms 14 can typically be controlled by the operator from inside the cab of the truck 10 to release the tailgate 12. As illustrated in FIG. 1, the latch mechanism 14 usually includes a base attached to the rear of the truck bed 11 adjacent to the tailgate, and a hydraulically-actuated dog 15 for engaging one of the latch pins 13 extending from the tailgate 12. In the tail gate's closed position, the dog 15 draws and holds the latch pin 13 securely against the base of the latch mechanism 14. In the open position, the dog 15 is lifted upward to release the latch pin 13 from the base of the latch mechanism and thereby allow the tailgate 12 to pivot rearward.

Simply releasing the tailgate to swing freely open is acceptable in many fields of use, such as when the entire load is to be quickly dumped at a single location. However, this approach can be less than satisfactory in situations in which a generally even distribution of material is desired as the truck moves over a road or work area. In these cases, the tailgate 12 must be held in a partially open position to meter or control the flow of material (e.g., road salt or sand) from the truck bed 11 over time as the truck moves. One conventional approach to this problem has been to fasten chains 16 between side walls of the truck bed 11 and the tailgate 12, as shown in FIG. 1. The chains 16 limit the maximum opening of the tailgate 12 and are relatively easy to adjust. However, chains 16 can allow the tailgate 12 to pivot back toward the closed position, and thus chains have the disadvantage of not necessarily maintaining a uniform tailgate opening.

Therefore, a need exists for a method and device to securely hold the tailgate of a dump truck in a partially open position. Preferably, this improvement should be easy to use, inexpensive and suitable for use with a wide range of existing dump trucks.

The prior art in this field also includes a number of examples of devices to control the position of a dump truck's tailgate. For example, U.S. Pat. No. 7,591,513 (Morley) discloses a system for controlling the tailgate opening that uses a rigid connecting arm bolted to the tailgate. The body of the dump truck includes a control unit that catches the end piece of the connecting arm as the tailgate falls to the closed position. The operator can select any of a number of opening positions for the tailgate.

U.S. Pat. No. 6,302,491 (Anderson) discloses another example of a control system for controlling the position of a dump truck tailgate. An hydraulic actuator controls the position of an L-shaped latch member that regulates the degree of opening of the tailgate. U.S. Pat. No. 3,572,837 (Lackey) shows a similar control system operated by rods, cables and pulleys. However, such systems have the disadvantages of significant cost and complexity, and would require substantial modifications to existing dump trucks.

3. Solution to the Problem

The present invention provides a method and device for holding the tailgate of a dump truck in a partially open position by means of a removable post having openings at its ends for engaging the latch pin extending from the tailgate and the latch on the rear of the dump truck. The dog of the latch is then inserted into an opening in the proximal end of the post to secure the post to the latch.

This approach allows the present invention to be used in conjunction with a wide variety of existing dump trunks without requiring modifications. In addition, the present invention can be manufactured at relatively low cost, and can be quickly installed and removed in the field.

SUMMARY OF THE INVENTION

This invention provides a method and device for securing the tailgate of a dump truck in a partially open position. In particular, the present invention employs a removable post having an elongated member with a horizontal hole through its distal end and a vertical opening in its proximal end. The distal end of the post is attached to the tailgate by inserting the latch pin through the hole in the distal end of the post. The proximal end of the post is inserted into the latch of the dump truck, and the dog of the latch is inserted into the opening in the proximal end of the post to secure the proximal end of the post to the latch.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 1:
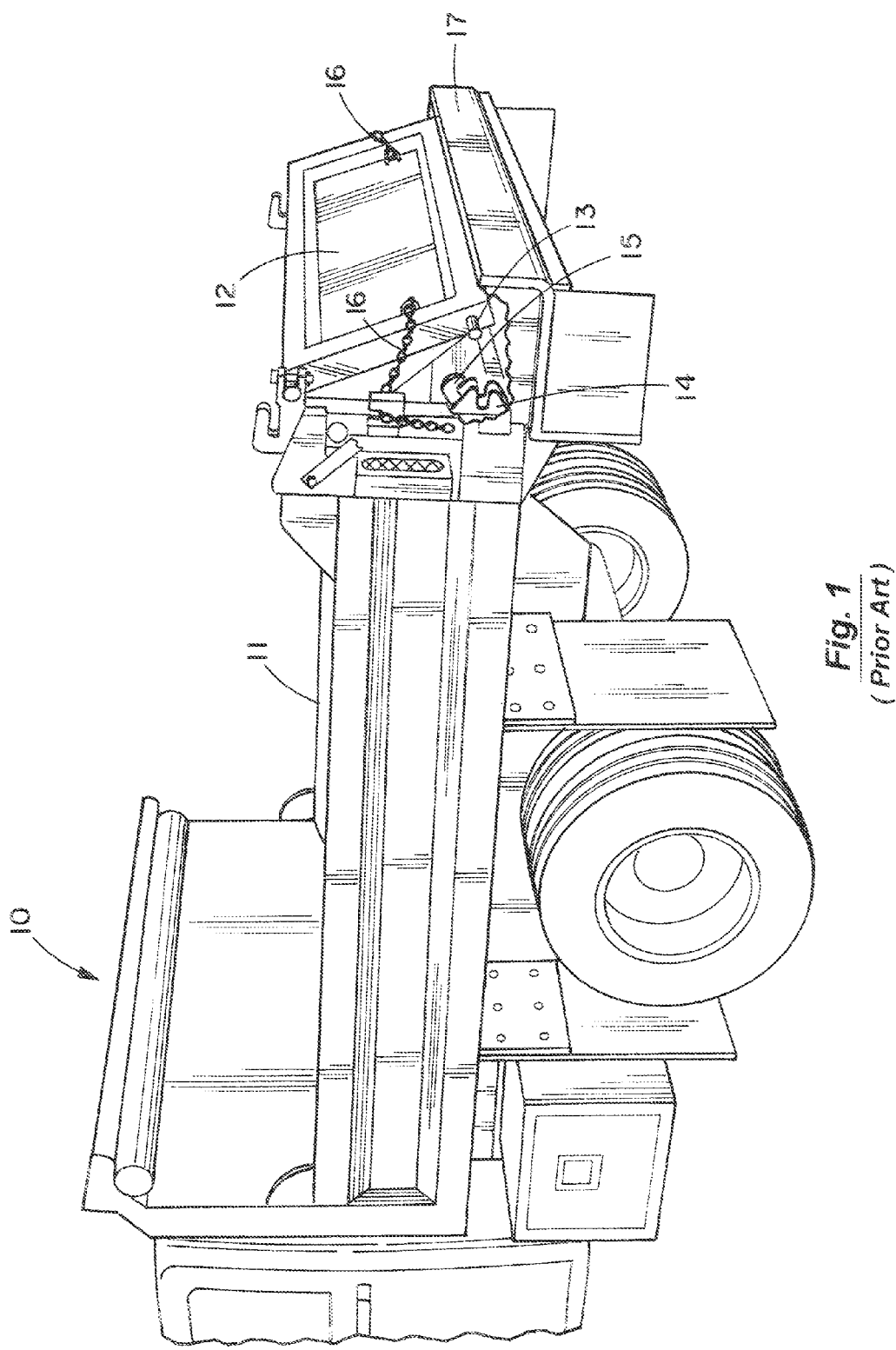
FIG. 1 is a rear perspective view of a conventional dump truck 10 equipped with chains 16 to limit that maximum tailgate opening.
Figure 2:
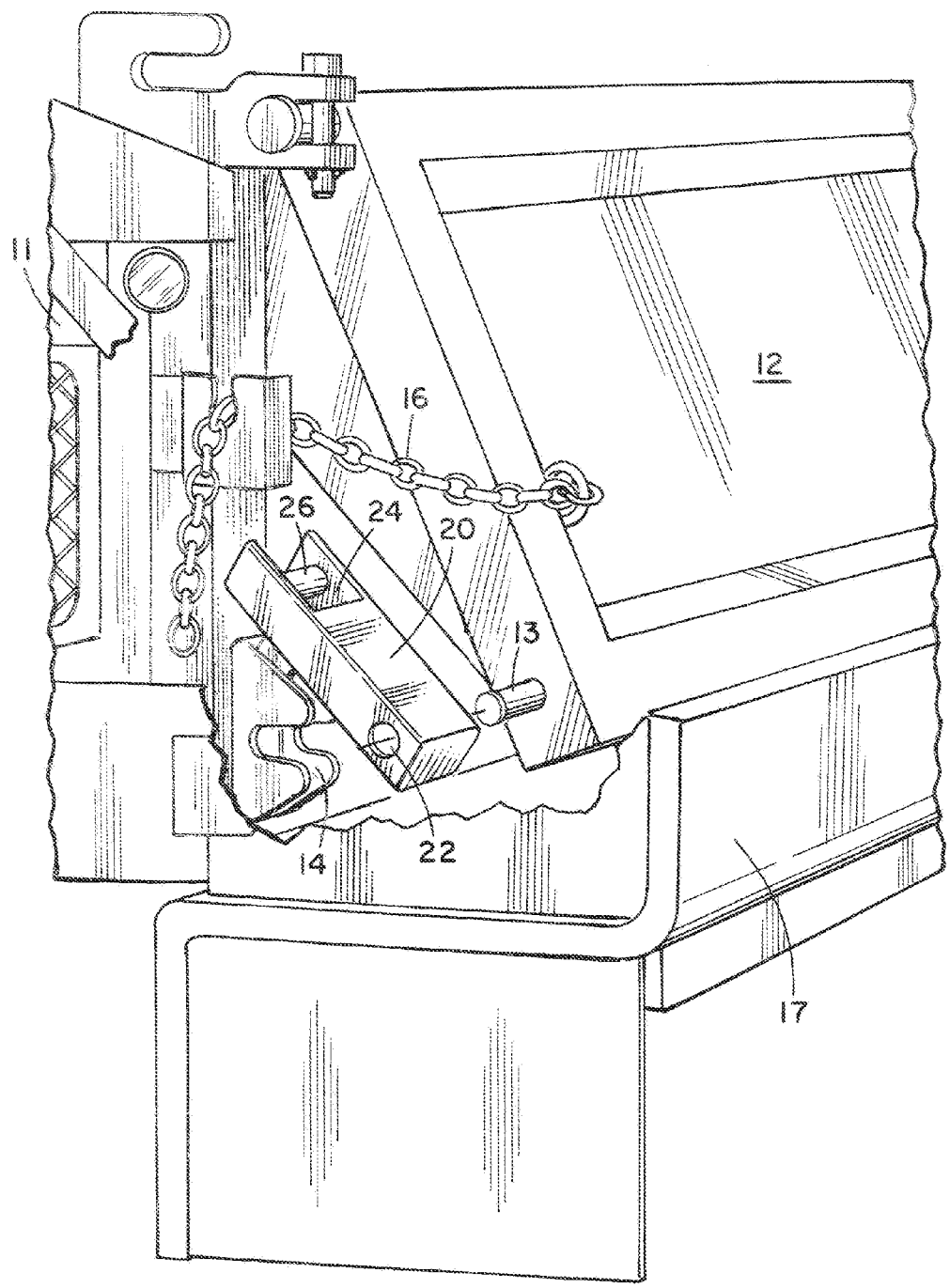
FIG. 2 is a detail rear perspective view of the rear portion of a dump truck 10 showing initial installation of the post 20.

Turning to the drawings, FIGS. 2-5 are a series of rear perspective views of a dump truck 10 illustrating the steps in the present methodology. As previously discussed, many conventional dump trucks 10 have a bed 11 for hauling material and a hinged rear tailgate 12. Two latch pins 13 extend horizontally outward from the opposing sides of the tailgate 12. Corresponding latches 14 are mounted on the rear of the dump truck bed 11 to receive the latch pins 13 and hold the tailgate 12 in the closed position. Each latch 14 is equipped with a dog 15 that can actuated by the truck operator to engage a latch pin 13 and secure it in a latch 14. Similarly, disengaging the dogs 15 releases the tailgate 12 from the latches 14, which allows the tailgate 12 to open by pivoting rearward from the dump truck bed 11, as shown in FIG. 2. Optionally, a distribution box 17 can be attached to the truck bed beneath the opening of the tailgate 12 to more evenly distribute sand or road salt exiting the dump truck bed 11.

Figure 6:
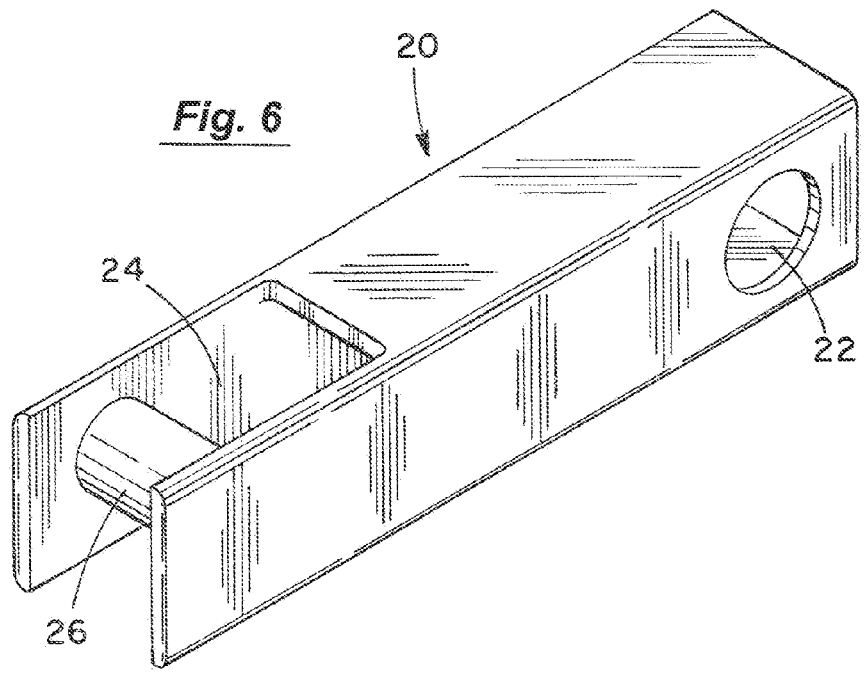
FIG. 6 is a perspective view of the post 20.
Figure 7:
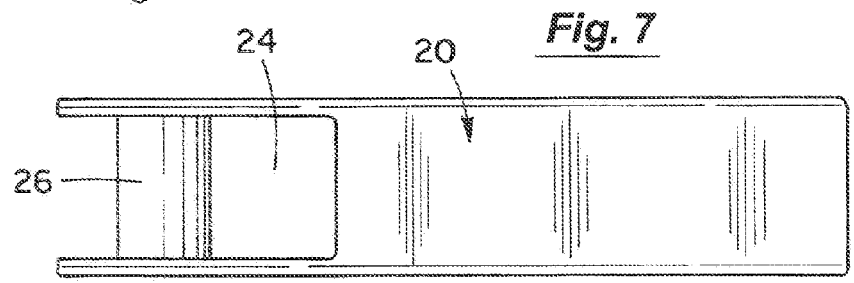
FIG. 7 is a top plan view of the post 20.
Figure 8:
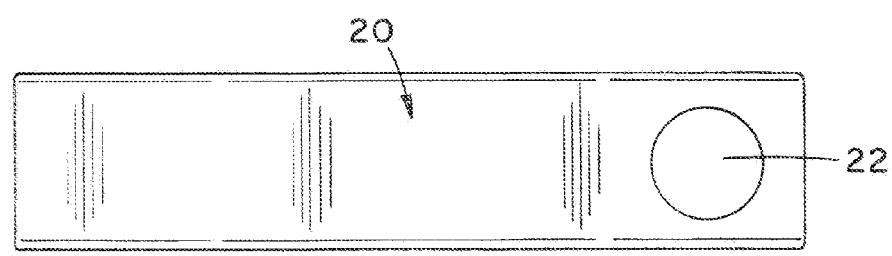
FIG. 8 is a right side elevational view of the post 20.
Figure 9:
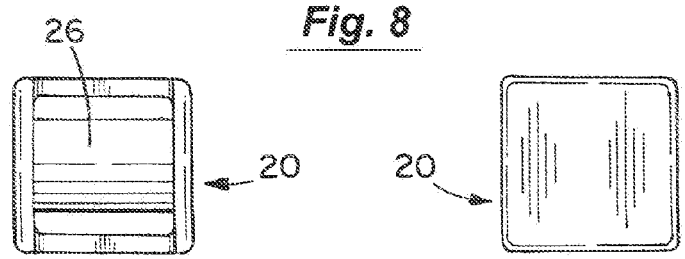
FIG. 9 is an end view of the proximal end of the post 20.
Figure 10:
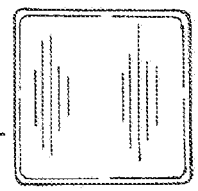
FIG. 10 is an end view of the distal end of the post 20.

FIG. 6-10 depict the removable post 20 used in the present invention to hold the tailgate 12 in a partially open position. FIG. 6 is a perspective view of the post 20. Corresponding top, right side, and end views of the post 20 are shown in FIGS. 7-10, respectively. This embodiment of the post 20 has an elongated member with a substantially rectangular, tubular cross-section. The distal end of the post 20 has a hole 22 extending horizontally through the post 20 for receiving a latch pin 13. The proximal end of the post 20 has two opposing side walls defining a vertical opening 24 through the proximal end of the post 20. A transverse pin 26 extends across the opening 24 between the side walls for seating in the latch 14 and engaging the dog 15, as will be described in greater detail below. Preferably, the transverse pin 26 is substantially cylindrical and extends horizontally across the opening 24.

Returning to FIGS. 2-5, the following is a discussion of the sequence of steps employed to install the post 20 in the field. If necessary, both dogs 15 associated with the latches 14 are released from the latch pins 13 to allow the tailgate 12 to be opened to a desired position relative to the dump truck bed 11 as depicted for example in FIG. 2.

Figure 3:
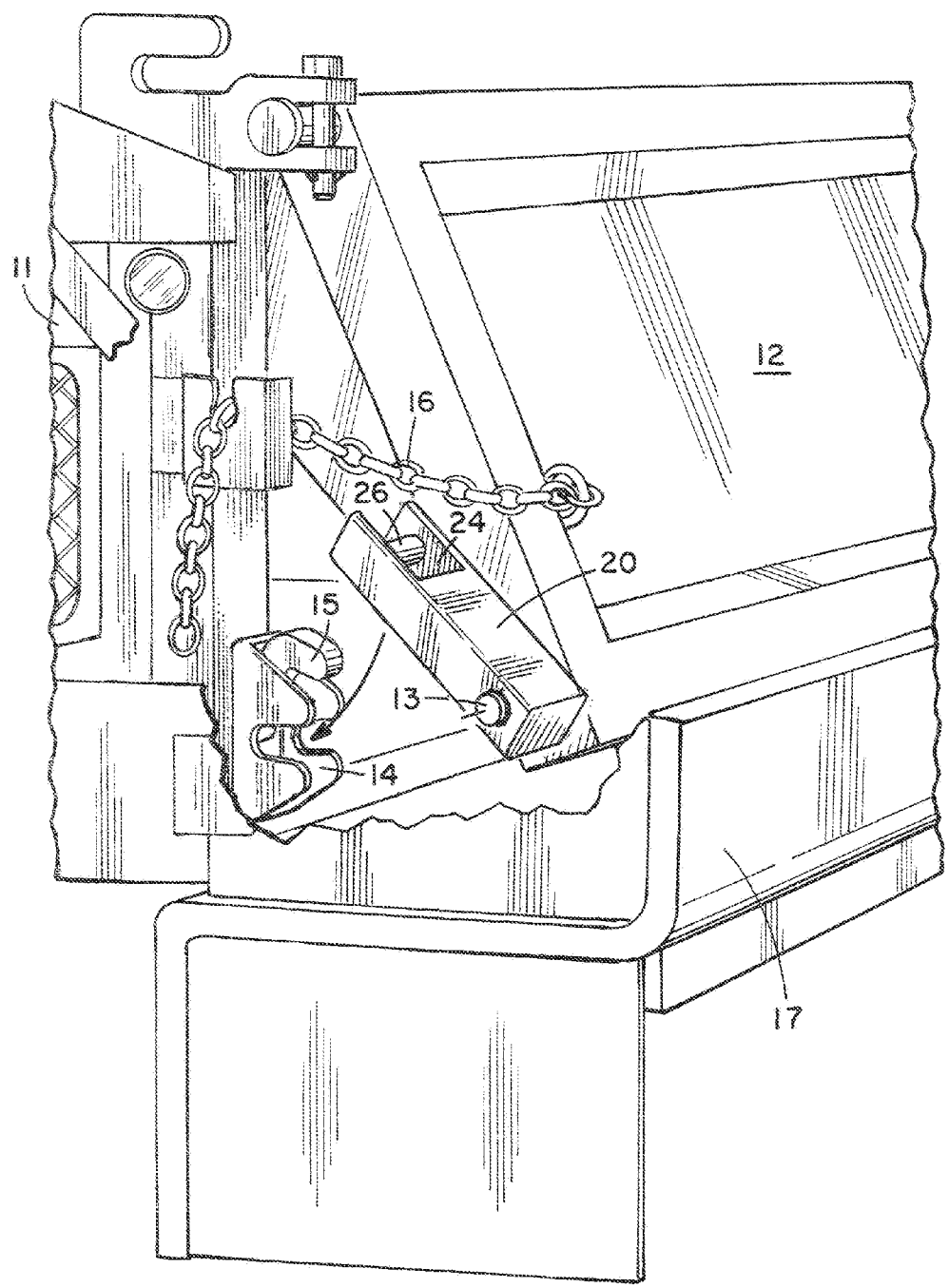
FIG. 3 is a detail rear perspective view corresponding to FIG. 2 after the distal end of the post 20 has been placed over the latch pin 13 extending from the tailgate 12.

Next, the distal end of the post 20 is attached to the tailgate 12 by inserting the latch pin 13 through the hole 22 in the distal end of the post 20. FIG. 3 is a detail rear perspective view corresponding to FIG. 2 after the distal end of the post 20 has been placed over the latch pin 13 extending from the tailgate 12.

Figure 4:
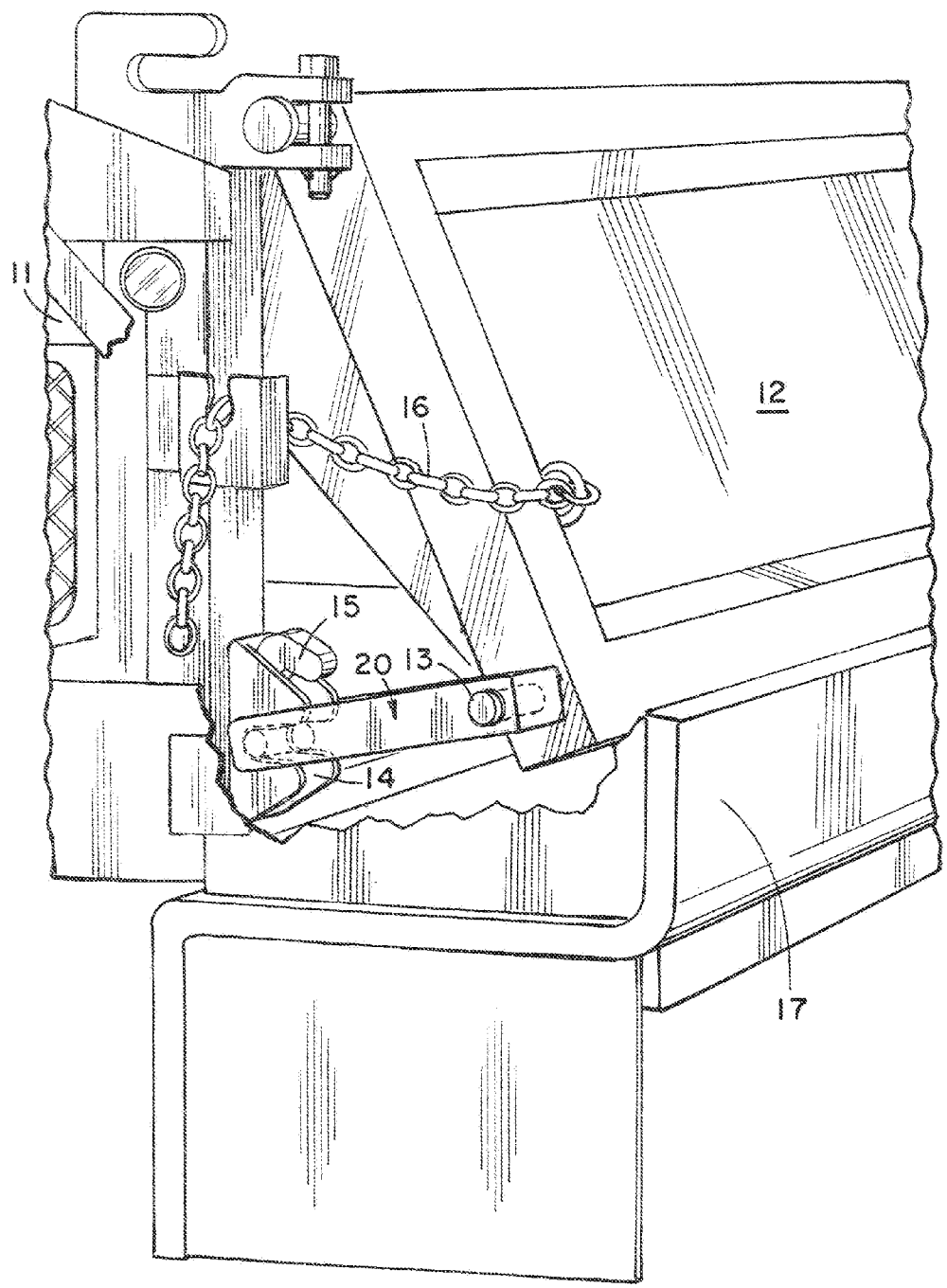
FIG. 4 is a detail rear perspective view corresponding to FIGS. 2 and 3 after the proximal end of the post 20 has been seated in the latch 14.
Figure 5:
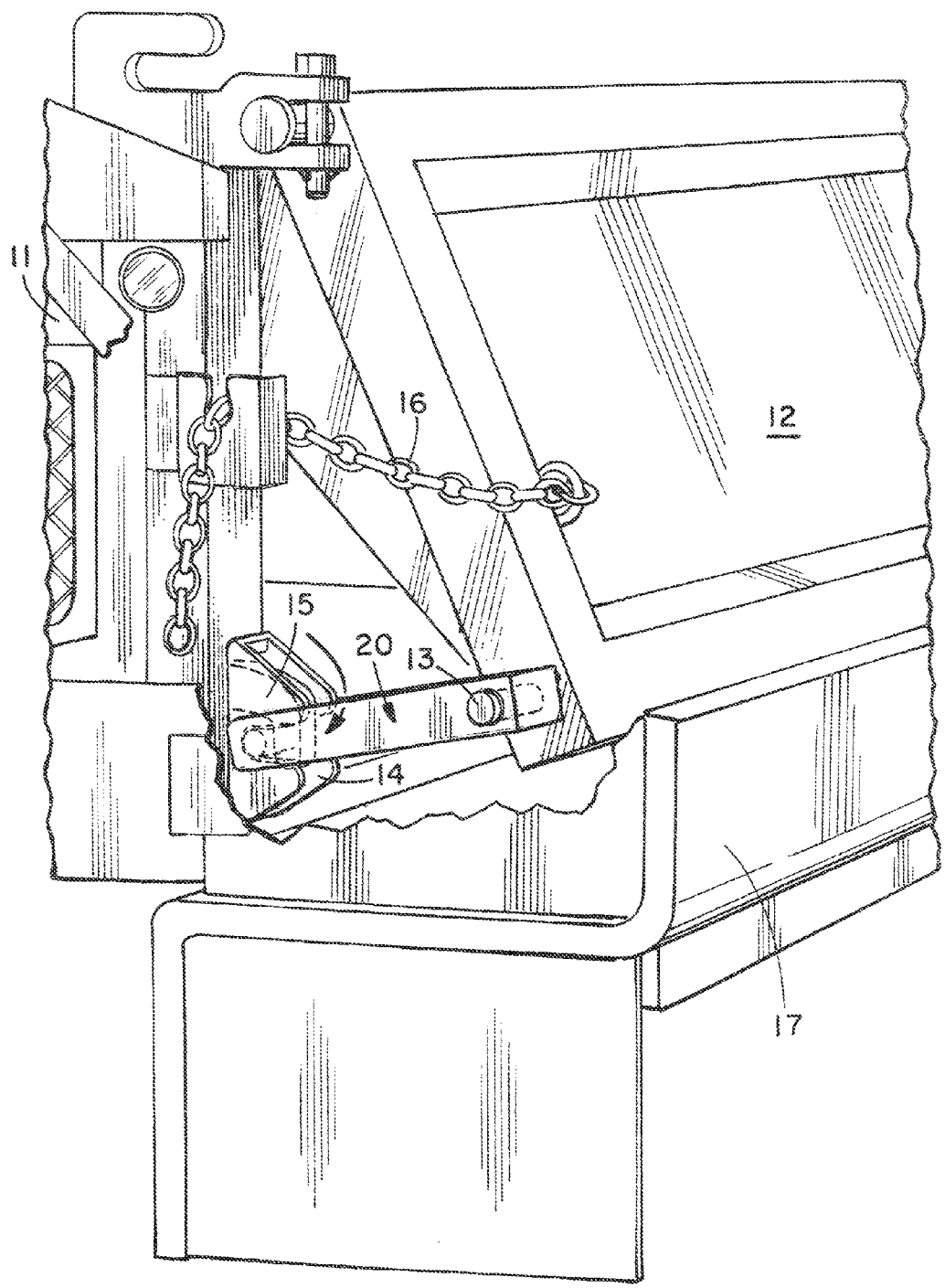
FIG. 5 is a detail rear perspective view corresponding to FIGS. 2-4 after the dog 15 has been lowered to engage the proximal end of the post 20.

The proximal end of the post 20 is then seated against the latch 14, as shown in FIG. 4. In particular, the transverse pin 26 is seated in the notch of the latch 14. Finally, the dog 15 is inserted into the opening 24 in the proximal end of the post 20 to secure the proximal end of the post 20 to the latch 14, which holds the tailgate 12 open in a predetermined position as illustrated in FIG. 5.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A method for securing a tailgate of a dump truck in a partially open position, said dump truck having the tailgate with a latch pin extending laterally outward and a latch with dog for engaging the latch pin to secure the tailgate in a closed position, said method comprising:
   releasing the dog of the latch from the latch pin on the tailgate;
   providing a post having an elongated member with a horizontal hole through a distal end, and a vertical opening in a proximal end;
   attaching the distal end of the post to the tailgate by inserting the latch pin through the hole in the distal end of the post;
   inserting the proximal end of the post into the latch of the dump truck; and
   inserting the dog of the latch into the opening in the proximal end of the post to secure the proximal end of the post to the latch, thereby holding the tailgate open in a predetermined position.

2. The method of claim 1 wherein the post further comprises:
   the elongated member having the proximal end and the distal end;
   the horizontal hole extending through the distal end for receiving the latch pin of the tailgate;
   two opposing side walls at the proximal end defining the vertical opening through the proximal end of the elongated member; and
   a transverse pin extending across the opening between the side walls.

3. The method of claim 2 wherein the transverse pin is cylindrical.

4. The method of claim 2 wherein the elongated member has a substantially rectangular tubular cross-section.

5. The method of claim 2 wherein the transverse pin is seated in the latch when the proximal end of the post is inserted into the latch, and then engaged by the dog to secure the proximal end of the post to the latch.

\* \* \* \* \*